United States Patent [19]

Akazawa et al.

[11] Patent Number: 4,866,734
[45] Date of Patent: Sep. 12, 1989

[54] RECEIVER FOR SPREAD SPECTRUM COMMUNICATION

[75] Inventors: Shigeo Akazawa; Masaharu Mori; Masahiro Hamatsu, all of Tokyo, Japan

[73] Assignee: Clarion Co., Ltd., Tokyo, Japan

[21] Appl. No.: 222,180

[22] Filed: Jul. 21, 1988

[30] Foreign Application Priority Data

Jul. 31, 1987 [JP] Japan .................... 62-192215
Jul. 31, 1987 [JP] Japan .................... 62-192216

[51] Int. Cl.$^4$ ........................ H04K 1/02
[52] U.S. Cl. ................................ 375/1
[58] Field of Search .............. 375/1; 380/34; 364/728.01, 728.02

[56] References Cited

U.S. PATENT DOCUMENTS

| | | | |
|---|---|---|---|
| 4,025,772 | 5/1977 | Constant | 364/728.01 |
| 4,080,660 | 3/1978 | Constant | 364/728.01 |
| 4,161,033 | 7/1979 | Martinson | 364/728.02 |
| 4,630,283 | 12/1986 | Schioff | 375/1 |
| 4,672,629 | 6/1987 | Beier | 375/1 |
| 4,707,839 | 11/1987 | Andren et al. | 375/1 |
| 4,761,795 | 8/1988 | Beier | 375/1 |

*Primary Examiner*—Salvatore Cangialosi
*Attorney, Agent, or Firm*—Flynn, Thiel, Boutell & Tanis

[57] ABSTRACT

A receiver for spread spectrum communication decoding spread spectrum signals so as to obtain data by correlating a same received signal given to a first input of each of the convolvers constituting a correlator with two reference signals given to the other input of each of the convolvers, is disclosed, in which a phase shifter is disposed on the other input side of either one of the convolvers and the phase shifter generates one of the two reference signals having a predetermined phase difference with respect to the other.

5 Claims, 5 Drawing Sheets

RECEIVER FOR SPREAD SPECTRUM COMMUNICATION

FIELD OF THE INVENTION

This invention relates to a receiver for spread spectrum communication and in particular to an improvement of a phase shift method in a convolver system of the receiver stated above.

BACKGROUND OF THE INVENTION

The spread spectrum communication is characterized in that emission spectrum spread of information to be transmitted is effected by using PN codes (e.g. M-code having a code length of 127) having a speed, which is much higher than the speed thereof, (with an enlarged frequency band), and on the receiver side the information is decoded by correlating a received signal with PN codes provided with in the receiver, and has features that deterioration of received signals due to frequency selective fading is reduced, etc.

As a spread spectrum receiver used for such a communication, there is known that disclosed in e.g. JP-A-59-18644-0. As illustrated in FIG. 4, the basic construction of this receiver consists of matched filters 1 and 2, a phase shifter 3 and a phase detector 4. The received signal S having a spread spectrum is inputted to the matched filter 1 and 2 and correlated there so that output signals A and B are obtained. Then the output signal B is shifted in phase by 90° by the phase shifter 3. Finally, the output signal B shifted in phase and the output signal A stated above are given to the phase detector 4 to decode a data signal D.

OBJECT OF THE INVENTION

However, in the construction of the receiver for spread spectrum communication as described above, since the phase shifter is disposed on the output side of the matched filter, it is a matter of course that since it is necessary to shift a wide band output signal in phase, this phase shifter has necessarily a wide frequency band characteristic. Moreover, the wider the spread frequency band is, the greater the band width of the phase shifter should have. In addition, it is necessary to shift it in phase uniformly in that frequency band. It is extremely difficult to realize a phase shifter satisfying these conditions. Further, in practice, in order to compensate phase shifts produced by fluctuations in characteristics of parts, fluctuations in electrical length of wiring, variations in temperature, etc. The phase shifter described above should be so constructed that phase control is possible and it is extremely different to realize it for a wide frequency band.

Therefore, the object of this invention is to provide a spread spectrum receiver having a construction suitable for practical use, in which it is easy to realize the phase shifter and its phase control is possible.

SUMMARY OF THE INVENTION

In order to achieve the above object, a receiver for spread spectrum communication according to this invention comprises a correlator consisting of a first convolver and a second convolver, a same received signal being given to a first input of each of the convolvers; a first multiplier giving a second input of the first convolver a first reference signal produced by multiplying a first CW signal and a first PN code; a a second multiplier giving a second input of the second convolver a second reference signal produced by multiplying a second CW signal having the same frequency as the first CW signal and a predetermined phase difference with respect to the phase thereof and a second PN code; decoding means for decoding outputs of both the convolvers so as to obtain data; and a phase shifter disposed on the second input side of the first or the second convolver and producing the second CW signal from the first CW signal.

In the receiver for spread spectrum communication according to this invention, since the phase shifter only shifts the phase of the first CW signal to a predetermined value so as to produce the second CW signal, it is not necessary for the phase shifter to have a wide frequency band characteristic. Therefore, it is each to realize it and it can be so constructed that the phase control thereof is possible.

DETAILED DESCRIPTION

Figure 1:
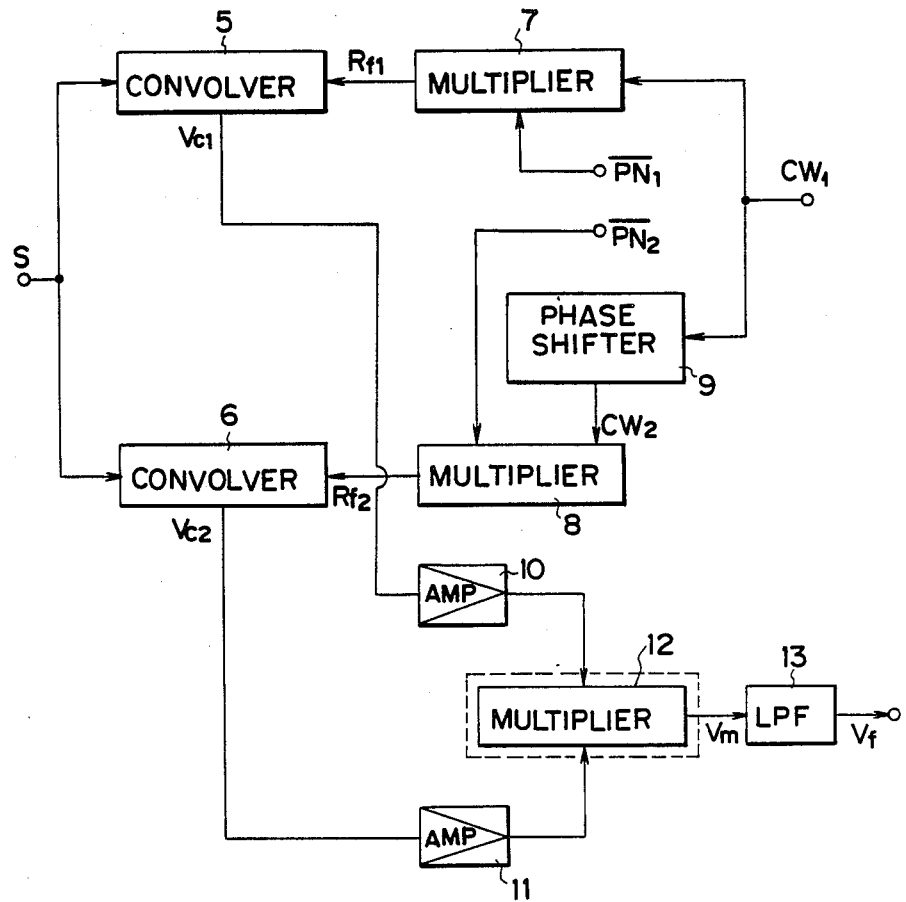
FIG. 1 is a block diagram illustrating an embodiment of this invention.

Hereinbelow this invention will be explained, referring to embodiments indicated in the drawings. FIG. 1 shows the basic construction of a first embodiment of the receiver for spread spectrum communication according to this invention. In the figure, reference numerals 5 and 6 are convolvers; 7 and 8 are multipliers; 9 is a phase shifter; 10 and 11 are amplifiers; 12 is a multiplier and 13 is a low pass filter.

A received spread spectrum signal S is applied to one input of each of the convolvers 5 and 6, while a first and a second reference signal Rf1 and Rf2 are applied to the other inputs thereof, respectively.

A CW signal $CW_1$ having the same frequency as the RF carrier signal of the spread spectrum signal S is given to the phase shifter 9 and to one input of the multiplier 7. The phase shifter 9 shifts the phase of the CW signal $CW_1$ to a predetermined value and gives one input of the multiplier 8 a signal thus obtained. PN codes $\overline{PN1}$ and $\overline{PN2}$, which are necessary for decoding them, are given to the other input of each of the multipliers 7 and 8, the outputs of the multipliers 7 and 8 being the first and the second reference signals Rf1 and Rf2, respectively.

The convolvers 5 and 6 correlate the spread spectrum signal S with the first and the second reference signals Rf1 and Rf2, respectively, and their correlation outputs Vc1 and Vc2 are applied to the multiplier 12 through the amplifiers 10 and 11, respectively. The output of the multiplier 12 is given to a low pass filter 13 and thus the decoded signal Vf representing data is obtained.

Now the reason why the decoded signal Vf representing data can be obtained, starting from the spread spectrum signal S received by the construction described in the above embodiment, will be explained.

The received spread spectrum signal S can be represented by;

$$S = Vd(t) = P_1(t) \text{ SIN } (\omega_0 t) + A \cdot P_2(t) \text{ COS } (\omega_0 t) \quad (1)$$

where P1(t) and P2(t) are a first and a second PN code used at the coding on the transmitter side; and A represents data, which are 1 or −1. The signal S is given equally to the two convolvers. The first and the second reference signals Rf1 and Rf2 inputted to the two convolvers are expressed by;

$$R_{f1} = V_{r1}(t) = \overline{P_1(t)} \text{COS } (\omega_0 t) \quad (2)$$

$$R_{f2} = V_{r2}(t) = \overline{P_2(t)} \text{COS } (\omega_0 t + \theta) \quad (3)$$

where $\theta$ represents the amount of phase shift in the phase shifter, and $\overline{P_1(t)}$ and $\overline{P_2(t)}$ are the PN codes $\overline{PN1}$ and $\overline{PN2}$ used at the decoding on the receiver side, which are minor images (time inverted signals) of P1(t) and P2(t) used on the transmitter side, respectively. The outputs Vc1 and Vc2 of the two convolvers are $$V_{c1}(t) = CONV\{Vd(t), V_{r1}(t)\} \quad (4)$$
$$V_{c2}(t) = CONV\{Vd(t), V_{r2}(t)\} \quad (5)$$

where CONV{V1(t), V2(t)} represents the convolution of the two inputs V1(t) and V2(t). Supposing that $$V_1(t) = \text{COS } (\omega_0 t) \quad (6)$$

$$V_2(t) = \text{COS } (\omega_0 t + \theta) \quad (7)$$

the output CONV{V1(t), V2(t)} can be expressed by;

$$CONV\{V_1(t), V_2(t)\} = \eta \cdot \text{COS } (2\omega_0 t + \theta + \phi) \quad (8)$$

where $\eta$ designates the efficiency of the convolver and $\phi$ represents an additional phase, inherent in the convolver. Therefrom it can be understood that the phase variation $\theta$ in one of the inputs V2(t) appears in the output as it is;

Since the correlations of P1(t) with $\overline{P_2(t)}$ and P2(t) with $\overline{P_1(t)}$ are small, even if the following equations are presumed;

$$V_{c1}(t) \approx CONV\{P_1(t)\text{SIN } (\omega_0 t), P_1(t)\text{COS } (\omega_0 t)\} \quad (9)$$

$$V_{c2}(t) \approx CONV\{A \cdot P_2(t)\text{COS } (\omega_0 t), P_2(t)\text{COS } (\omega_0 t + \theta)\} \quad (10)$$

no great errors are produced. Equation (9) and (10) can be transformed further into;

$$V_{c1}(t) = \eta_1 \cdot A \cdot R_1(t)\text{SIN } (2\omega_0 t + \phi_1) \quad (11)$$

$$V_{c2}(t) = \eta_2 \cdot A \cdot R_2(t)\text{COS } (2\omega_0 t + \theta + \phi_2) \quad (12)$$

where R1(t) and R2(t) are convolutions of P1(t) with $\overline{P_1(t)}$ and P2(t) with $\overline{P_2(t)}$; and $\phi_1$ and $\phi_2$ are additional phases inherent in the convolvers.

The output Vm(t) after the multiplication of Vc1(t) and Vc2(t) is given by;

$$\begin{aligned}Vm(t) &= V_{c1}(t) \cdot V_{c2}(t) \\ &= \eta_1 \cdot \eta_2 \cdot A \cdot R_1(t) \cdot R_2(t) \cdot \text{COS } (2\omega_0 t + \phi_1) \\ &\quad \text{COS } (2\omega_0 t + \theta + \phi_2)\end{aligned} \quad (13)$$

Supposing that $$\theta + \phi_1 = \phi_1 - \pi/2 \quad (14)$$

Equation (13) can be transformed further as follows;

$$\begin{aligned}Vm(t) &= \eta_1 \cdot \eta_2 \cdot A \cdot R_1(t) \cdot R_2(t) \cdot \text{SIN } (2\omega_0 t + \phi_1) \cdot \\ &\quad \text{COS } (2\omega_0 t + \phi_1 - \pi/2) \\ &= \eta_1 \cdot \eta_2 \cdot A \cdot R_1(t) \cdot R_2(t) \cdot \text{SIN}^2 (2\omega_0 t + \phi_1)\end{aligned} \quad (15)$$

Furthermore, the decoded signal Vf(t) obtained by making Vm(t) pass through the low pass filter can be represented by;

$$V_f(t) = \eta_1 \cdot \eta_2 \cdot A \cdot R_1(t) \cdot R_2(t) \quad (17)$$

Figure 2:
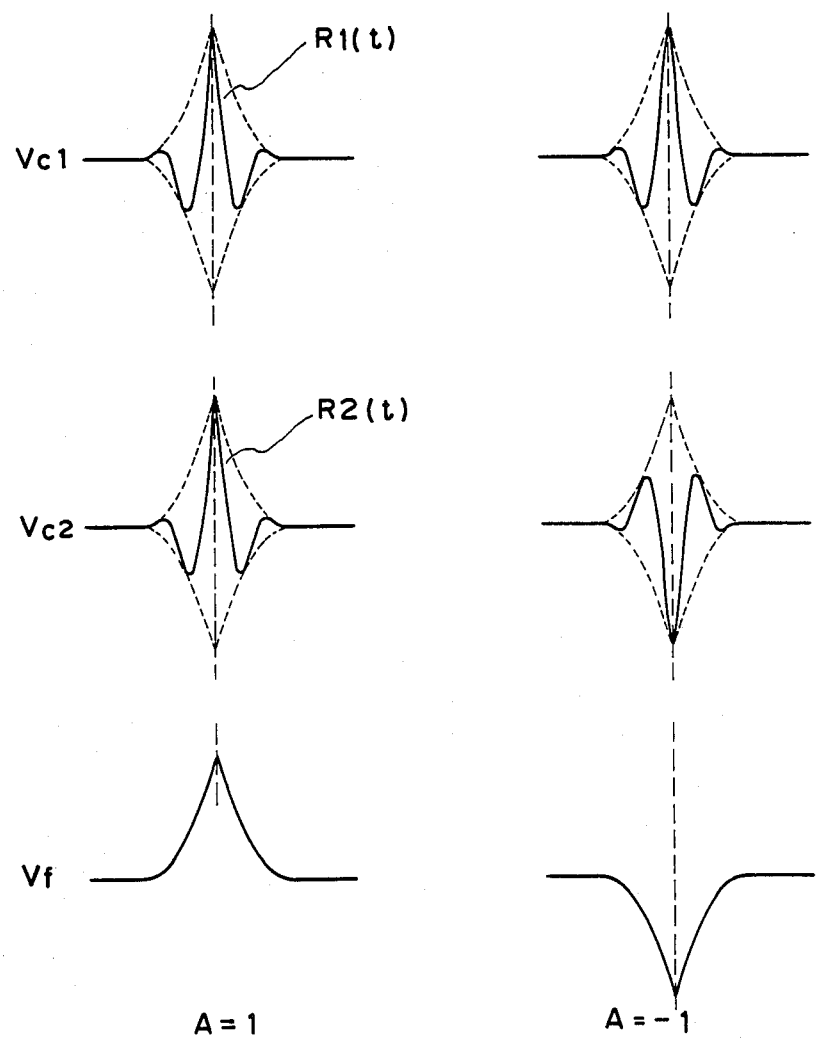
FIG. 2 shows waveforms for explaining the working mode of the receiver indicated in FIG. 1.

FIG. 2 shows an example of each of Vc1(t), Vc2(t) and Vf(t), when Equation (14) is supposed. From this figure and Equation (17), it can be understood that the decoding to data is possible.

Consequently, in this case, from Equation (14) the predetermined amount of phase shift 8 in the phase shifter may be given by;

$$\theta = \phi_1 - \pi/2 - \phi_2 \quad (16)$$

In addition, it is obvious that e.g. non-linear circuits using transistors or diodes mayd be used as the multipliers 7, 8 and 12 described above.

Moreover it is also possible that an adder 14 and a subtractor 15 are used as the multiplier 12 described above, as indicated in FIG. 3, so that the outputs Vc1 and Vc2 of the convolvers 5 and 6 are added to and subtracted from each other, as follows.

Figure 3:
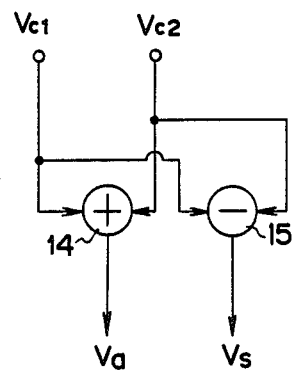
FIG. 3 is an example indicating an example of a multiplier.
Figure 4:
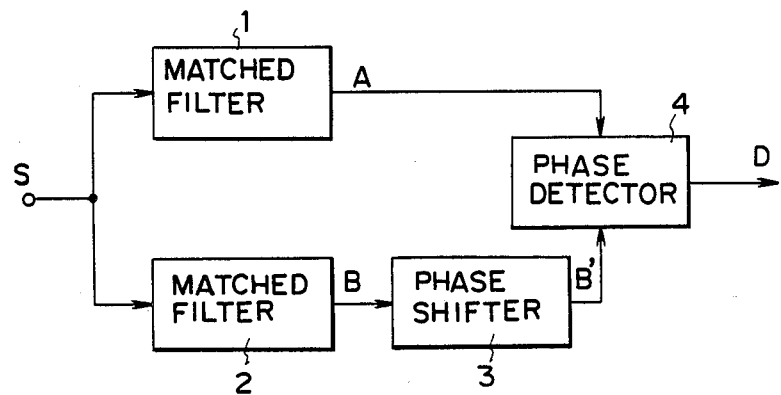
FIG. 4 is a block diagram illustrating an example of a prior art receiver for spread spectrum communication.

That is, in FIG. 3, Va(t), which is a signal obtained by adding Vc1 and Vc2, is given by;

$$Va(t) = \eta_1 \cdot A \cdot R_1(t) \cdot \text{SIN } (2\omega_0 t + \phi_1) + \eta_2 \cdot R_2(t) \cdot \text{COS } (2\omega_0 t + \theta + \phi_2) \quad (18)$$

and Vs(t), which is a signal obtained by subtracting Vc2 from Vc1, is given by;

$$Vs(t) = \eta_1 \cdot A \cdot R_1(t) \cdot \text{SIN } (2\omega_0 t + \phi_1) - \eta_2 \cdot R_2(t) \cdot \text{COS } (2\omega_0 t + \theta + \theta_2) \quad (19)$$

Here, when it is presumed that Equation (14), $\eta_1 = \eta_2$ nz and R1(t)=R2(t), they can be rewritten as follows:

$$\begin{aligned}Va(t) &= \eta_1 \cdot A \cdot R_1(t) \cdot \text{SIN } (2\omega_0 t + \phi_1) + \eta_1 \cdot R_1(t) \cdot \\ &\quad \text{SIN } (2\omega_0 t + \phi_1) \\ &= \eta_1 \cdot R_1(t) \cdot \text{SIN } (2\omega_0 t + \phi_1) \cdot (A + 1)\end{aligned} \quad (20)$$

$$\begin{aligned}Vs(t) &= \eta_1 \cdot A \cdot R_1(t) \cdot \text{SIN } (2\omega_0 t + \phi_1) - \eta_1 \cdot R_1(t) \cdot \\ &\quad \text{SIN } (2\omega_0 t + \phi_1) \\ &= \eta_1 \cdot R_1(t) \cdot \text{SIN } (2\omega_0 t + \phi_1) \cdot (A + 1)\end{aligned} \quad (21)$$

From Equation (20) and (21), the following equations are obtained;
if 1, $$V_a(t) = 2\cdot\eta_1\cdot R_1(t)\cdot\text{SIN}\ (2\omega_0 t + \phi_1),\ Vs(t) = 0 \tag{22}$$

and if $A = -1$, $$V_a(t) = 0,\ Vs(t) = -2\cdot\eta_1\cdot R_1(t)\cdot\text{SIN}\ (2\omega_0 t + \phi_1) \tag{23}$$

By envelope-detecting Va(t) and Vs(t), it is possible to obtain outputs for $A = 1$ and $A = -1$.

This method, in which the sum and the difference of such signals are utilized, has an advantage that it is possible to take out separately outputs corresponding to $A = 1$ and to $A = -1$, with respect to the method, in which the multiplier is used.

Figure 5:
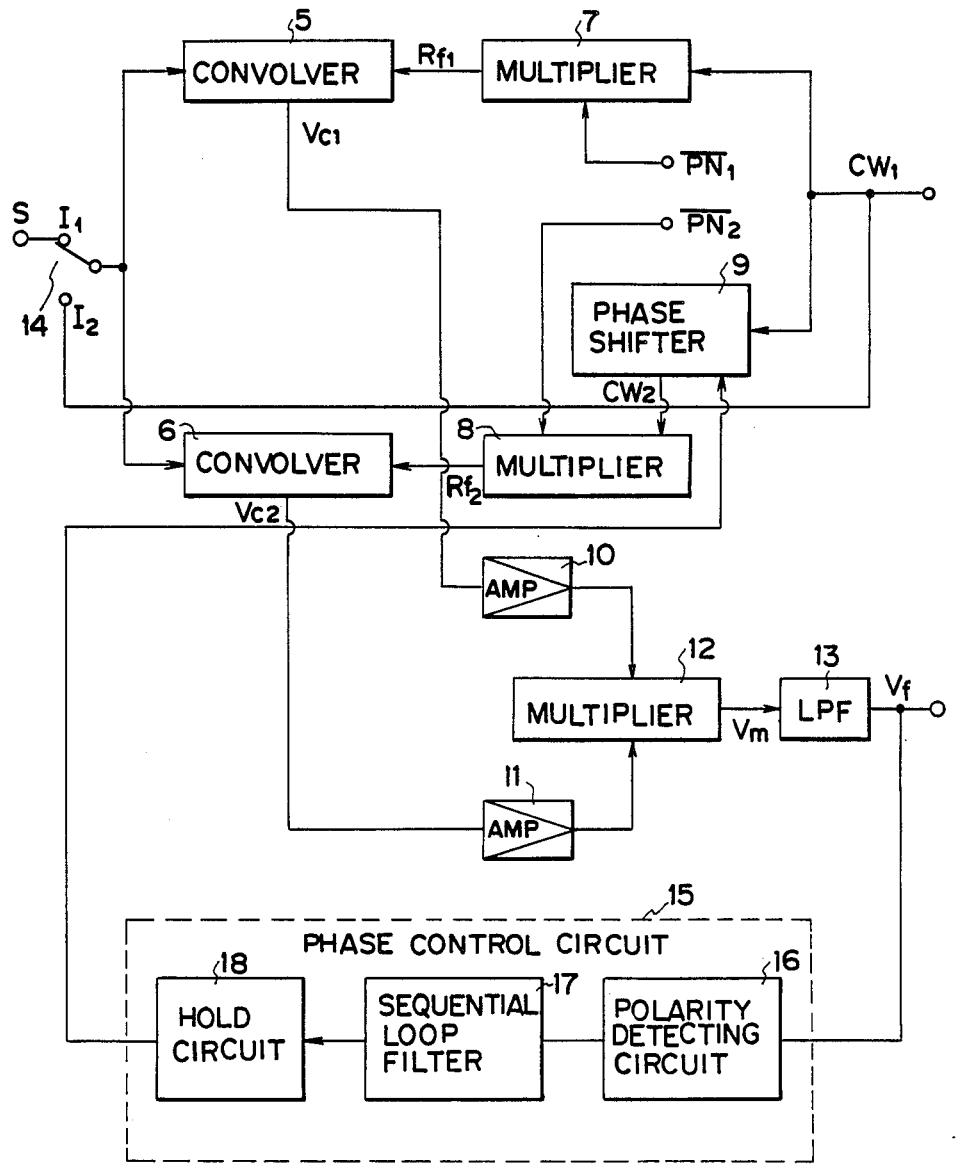
FIG. 5 is a block diagram illustrating another embodiment of this invention.

FIG. 5 shows another embodiment of this invention, in which the reference numerals used also in FIG. 1 represent the items identical or similar to those indicated in FIG. 1; 14 is a switch and 15 is a phase control circuit. The phase control circuit 15 consists of e.g. a polarity detecting circuit 16, a sequential loop filter 17 and a hold circuit 18.

When the switch 14 is on the contact point $I_1$ side, the fundamental operation that the received spread spectrum signal S is applied to one input of each of the convolvers 5 and 6 and the first and the second reference signal Rf1 and Rf2 are inputted to the other input thereof is identical to that described for FIG. 1. However, the operation of the circuit indicated in FIG. 5 differs from that indicated in FIG. 1 in the other.

That is, in the case where $\theta + \phi_2 = \phi_1$ in Equation (13), $Vf(t) = 0$ and therefore the decoding is impossible. As stated previously, $\phi_1$ and $\phi_2$ are not necessarily in agreement with each other because of slight differences of the characteristics of the two convolvers, small differences in temperature characteristics, length of wiring, etc.

For this reason, in the embodiment indicated in FIG. 5, in order to compensate this phase shift, the switch 14 is turned over to the contact point $I_2$ side. In this way, the CW signal $CW_1$ is given to one input of each of the convolvers 5 and 6 and in addition the first and the second PN codes are switched over to a DC bias voltage.

The input signal Vd(t) is given by;

$$Vd(t) = \text{COS}\ (\omega_0 t) \tag{24}$$

Since the first and the second PN codes are switched over to the DC bias voltage, the following equation is valid;

$$P_1(t) = P_2(t) = 1 \tag{25}$$

Consequently, the convolution outputs V'c1(t) and V'c2(t) are given by;

$$V'_{c1}(t) = \eta_1 \cdot \text{COS}\ (2\omega_0 t + \phi_1) \tag{26}$$

$$V'_{c2}(t) = \eta_2 \cdot \text{COS}\ (2\omega_0 t + \phi_2) \tag{27}$$

The output V'm(t) after the multiplication of V'c1(t) and V'c2(t) is represented by:

$$V'm(t) = \eta_1\cdot\eta_2\cdot\text{COS}\ (2\omega_0 t + \phi_1)\cdot\text{COS}\ (2\omega_0 t + \phi_2) \tag{28}$$

Here, if $$\theta + \phi_2 = \phi_1 - \pi/2 \tag{29}$$

then $V'm(t) = \eta_1\cdot\eta_2\cdot\text{COS}\ (2\omega_0 t + \phi_1)\cdot\text{SIN}\ (2\omega_0 t + \phi_1)$ (30)

and the output V'f(t) of the low pass filter is given by;

$$V'_f(t) \propto \eta_1\cdot\eta_2\cdot\text{COS}\ (\phi_1 - \theta - \phi_2) \tag{31}$$

By controlling the phase shifter so that when the output described above is positive, the phase is retarded and when it is negative, the phase is advanced, the control is effected so that the circuit is balanced at;

$$V'_f(t) = 0 \tag{32}$$

The balance condition at this time is;

$$\phi_1 - \theta - \phi_2 = \pi/2 \tag{33}$$

and therefore $$\theta = \phi_1 - \phi_2 - \pi/2 \tag{34}$$

This condition represented by Equation (34) is in agreement with the optimum condition of the decoding for obtaining data.

Further, this control can be achieved by the well known PLL control method.

That is, the output of the low pass filter 13 is given to the polarity detecting circuit 16 and the output of the polarity detecting circuit is filtered by the sequential loop filter 17. The output of the sequential loop filter is given to the hold circuit 18 and the phase filter 9 may be controlled by the output of this hold circuit. In this case, as long as the phase control is effected, the hold circuit 18 gives the phase shifter 9 the output of the sequential loop filter 17 as it is, but when the decoding for obtaining data is effected, it holds the output of the sequential loop filter 17 just before the system of FIG. 5 is turned over from the phase control to the decoding for obtaining data and continues to give the phase shifter 9 that value, which is utilized for keeping the optimum phase state.

Furthermore, whatever circuit, by which the phase control is possible, can be used as the phase shifter 9 and the switch may be driven with a suitable periodical timing at need.

Figure 6:
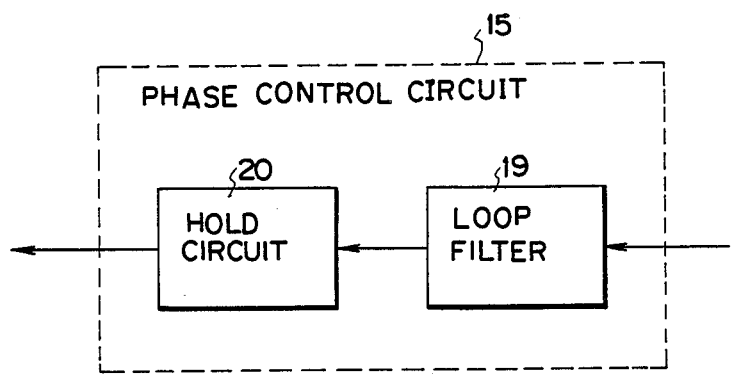
FIGS. 6 and 7 are block diagrams illustrating two different constructions of the phase control circuit used in the embodiment indicated in FIG. 5.
Figure 7:
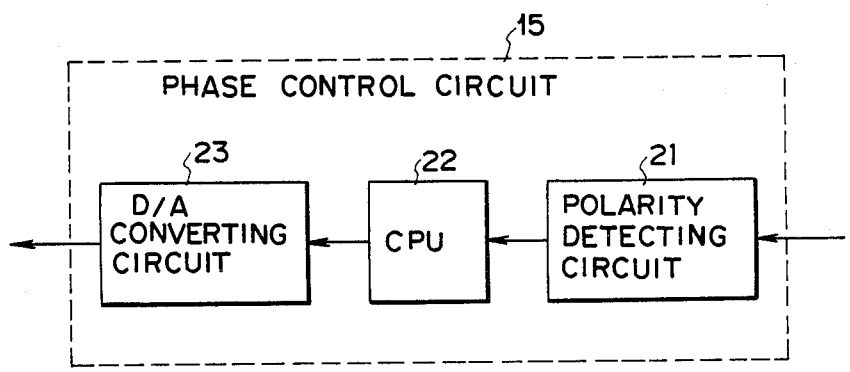

In addition, the phase control circuit 15 may be apart from the circuit described above, an analogue PLL giving the hold circuit 20 the output of the low pass filter 13 through a loop filter 19, as indicated in FIG. 6 and further it is obvious that the phase control circuit 15 may be also a PLL consisting of a polarity detecting circuit 21, a CPU 22 and a D/A converter 23, as indicated in FIG. 7.

As it is clear from the above explanation, according to this invention, since the phase shifter is disposed on the input side of the correlator consisting of two convolvers, contrarily to that used heretofore, and it is sufficient to shift the phase of a CW signal having a frequency band, which is not so wide as the spread spectrum signal, it is easy to realize it and it is suitable for practical use.

Furthermore, it is possible to realize easily the phase control of the phase shifter, which is necessary for the case where phase deviations due to differences between $\phi_1$ and $\phi_2$ described above are corrected.

What is claimed is:

1. A receiver for spread spectrum communication comprising:

a correlator consisting of a first convolver and a second convolver, a same received signal being given to a first input of each of the convolvers;

a first multiplier giving a second input of the first convolver a first reference signal produced by multiplying a first CW signal and a first PN code;

a second multiplier giving a second input of the second convolver a second reference signal produced by multiplying a second CW signal having the same frequency as the first CW signal and a predetermined phase difference with respect to the phase thereof and a second PN code;

decoding means for decoding outputs of both the convolvers so as to obtain data; and a phase shifter disposed on the second input side of the first or the second convolver for producing the second CW signal from the first CW signal.

2. A receiver for spread spectrum communication according to claim 1, wherein said decoding means consists of a multiplier, to which outputs of said first and second convolvers are given.

3. A receiver for spread spectrum communication according to claim 1, wherein said decoding means consists of an adder and a subtractor, to which outputs of said first and second convolvers are given.

4. A receiver for spread spectrum communication comprising:

a correlator consisting of a first convolver and a second convolver, a same received signal being given to a first input of each of the convolvers;

a first multiplier giving a second input of the first convolver a first reference signal produced by multiplying a first CW signal and a first PN code;

a second multiplier giving a second input of the second convolver a second reference signal produced by multiplying a second CW signal having the same frequency as the first CW signal and a predetermined phase difference with respect to the phase thereof and a second PN code;

a third multiplier for decoding outputs of both the convolvers so as to obtain data by multiplying them;

a phase shifter disposed on the second input side of the first or the second convolver for producing the second CW signal from the first CW signal;

switching means applying selectively either the received spread spectrum signal or the first CW signal to the first input of each of said convolvers; and phase control means for controlling the phase of said phase shifter in response to the output of said third multiplier.

5. A receiver for spread spectrum communication according to claim 4, wherein said phase control means consists of a polarity detecting circuit for judging the polarity of the output of said third multiplier and a sequential loop filter for filtering the output of said polarity detecting circuit to control said phase shifter by the output of said sequential loop filter.

* * * * *